US012748323B2

(12) United States Patent
Iwasaki et al.

(10) Patent No.: US 12,748,323 B2
(45) Date of Patent: Sep. 29, 2026

(54) CONTACT LENS WITH TWO ANTENNA ELEMENTS

(71) Applicants: SONY GROUP CORPORATION, Tokyo (JP); SONY SEMICONDUCTOR SOLUTIONS CORPORATION, Kanagawa (JP)

(72) Inventors: Masanori Iwasaki, Tokyo (JP); Yoshitaka Yoshino, Kanagawa (JP); Takayuki Hirabayashi, Kanagawa (JP); Tadashi Imai, Kanagawa (JP); Tsukasa Yoshimura, Tokyo (JP); Fumiko Shiga, Tokyo (JP)

(73) Assignees: SONY SEMICONDUCTOR SOLUTIONS CORPORATION, Kanagawa (JP); SONY GROUP CORPORATION, Tokyo (JP)

( * ) Notice: Subject to any disclaimer, the term of this patent is extended or adjusted under 35 U.S.C. 154(b) by 249 days.

(21) Appl. No.: 18/574,343

(22) PCT Filed: Mar. 16, 2022

(86) PCT No.: PCT/JP2022/011864
§ 371 (c)(1),
(2) Date: Dec. 27, 2023

(87) PCT Pub. No.: WO2023/281835
PCT Pub. Date: Jan. 12, 2023

(65) Prior Publication Data
US 2024/0295758 A1 Sep. 5, 2024

(30) Foreign Application Priority Data
Jul. 5, 2021 (JP) ................................ 2021-111775

(51) Int. Cl.
*G02C 11/00* (2006.01)
*G02C 7/04* (2006.01)

(52) U.S. Cl.
CPC ................ *G02C 11/10* (2013.01); *G02C 7/04* (2013.01)

(58) Field of Classification Search
CPC ........ H02J 50/001; H02J 50/005; H02J 50/10; H02J 50/12; H02J 50/20; H02J 50/40; H02J 50/402; G02C 11/10; G02C 7/04–049
See application file for complete search history.

(56) References Cited

U.S. PATENT DOCUMENTS

2013/0194540 A1* 8/2013 Pugh ................ B29D 11/00817 623/6.11
2014/0296674 A1* 10/2014 Etzkorn ............. A61B 5/14546 29/601

(Continued)

FOREIGN PATENT DOCUMENTS

JP 2003-088005 A 3/2003
JP 2018-534606 A 11/2018

(Continued)

OTHER PUBLICATIONS

Machine translation of JP2020016812 retrieved electronically from PE2E Search Jan. 15, 2026 (Year: 2020).*

(Continued)

*Primary Examiner* — Cara E Rakowski
(74) *Attorney, Agent, or Firm* — CHIP LAW GROUP

(57) ABSTRACT

A contact lens according to one embodiment of the present disclosure includes a lens substrate to be worn on an eyeball, an antenna unit that is provided on the lens substrate and receives alternating-current energy through a human body, and a load that receives electric power supplied from the antenna unit. The antenna unit includes a first antenna (Continued)

element including a first conductor and a second antenna element including a second conductor. The first conductor is provided on the lens substrate at a position that is in contact with the eyeball or an eyelid when an eye is open. The second conductor is provided on the lens substrate at a position that is separated from the first conductor by a predetermined gap and not in contact with the eyeball or the eyelid when the eye is open.

17 Claims, 18 Drawing Sheets

(56) References Cited

U.S. PATENT DOCUMENTS

| | | | | |
|---|---|---|---|---|
| 2017/0358841 A1* | 12/2017 | Chen | ...................... | H01Q 1/241 |
| 2020/0018990 A1* | 1/2020 | Mirjalili | ................. | G02C 11/10 |

FOREIGN PATENT DOCUMENTS

| | | | | |
|---|---|---|---|---|
| JP | 2020016812 A * | 1/2020 | | |
| WO | WO-9745502 A1 * | 12/1997 | ............... | C09D 1/00 |
| WO | 2016/067433 A1 | 5/2016 | | |

OTHER PUBLICATIONS

Machine translation of WO 9475502 A1 retrieved electronically from PE2E Search Jan. 16, 2026 (Year: 1997).*

International Search Report and Written Opinion of PCT Application No. PCT/JP2022/011864, issued on May 10, 2022, 09 pages of ISRWO.

* cited by examiner

[ FIG. 1 ]
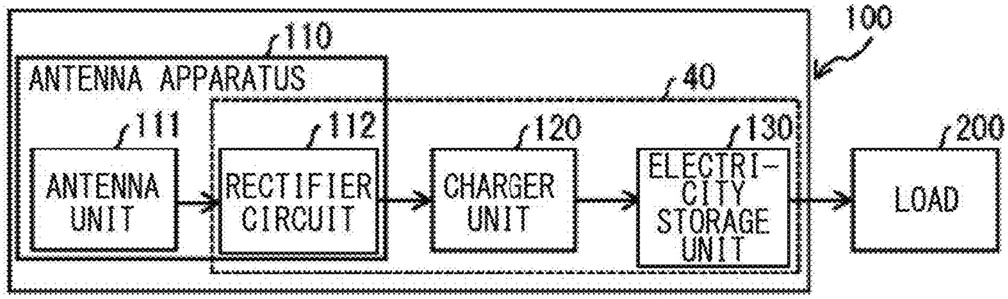
[ FIG. 2 ]
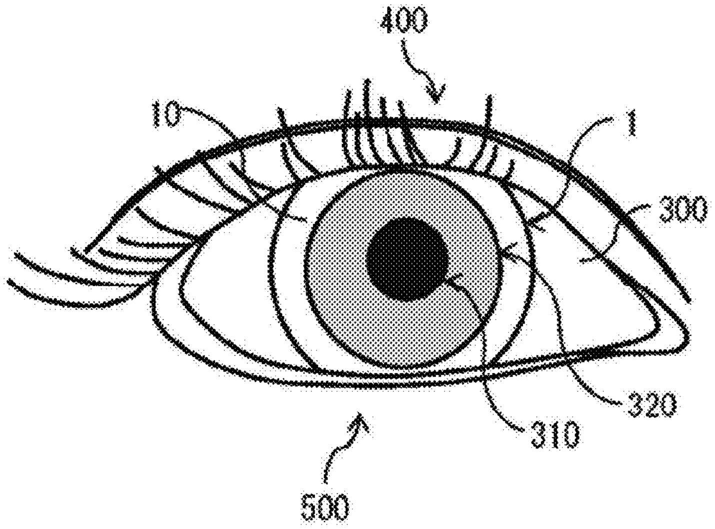
[ FIG. 3 ]
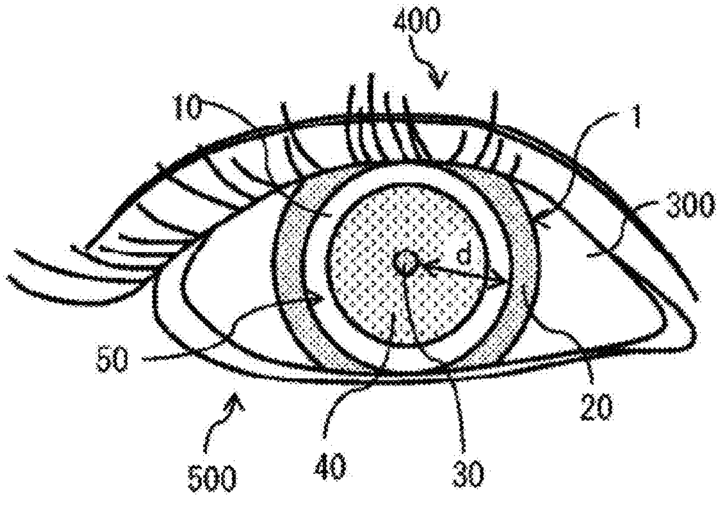

[ FIG. 4 ]
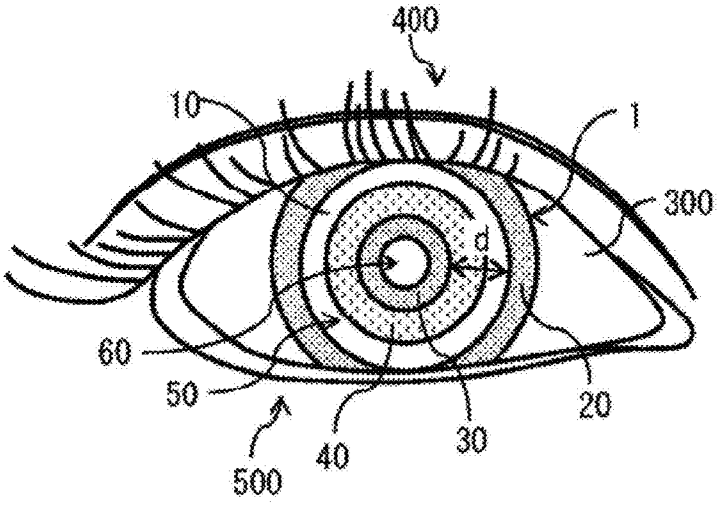
[ FIG. 5 ]
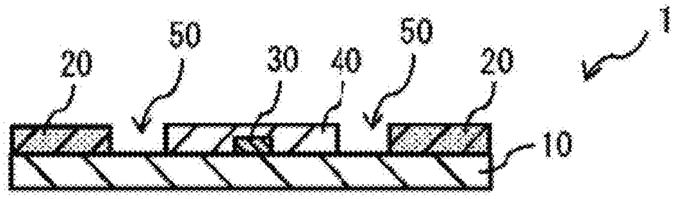
[ FIG. 6 ]
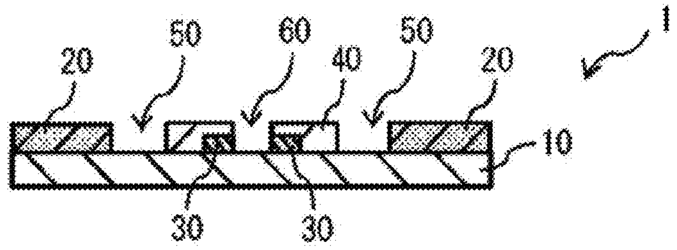
[ FIG. 7 ]
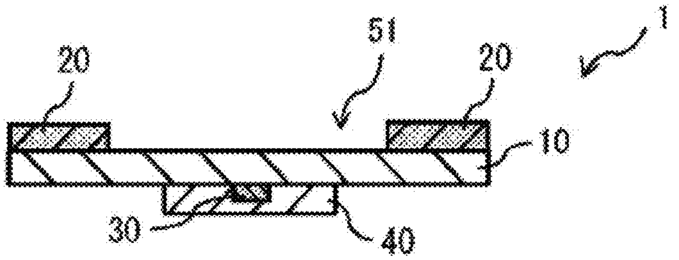

[ FIG. 8 ]
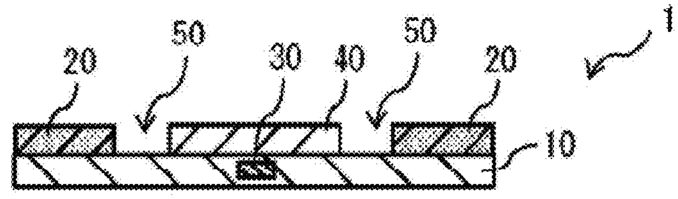
[ FIG. 9 ]
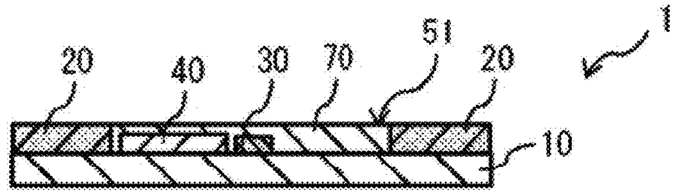
[ FIG. 10 ]
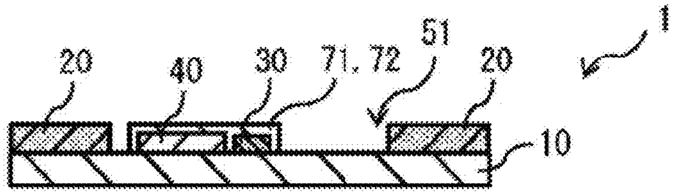
[ FIG. 11 ]
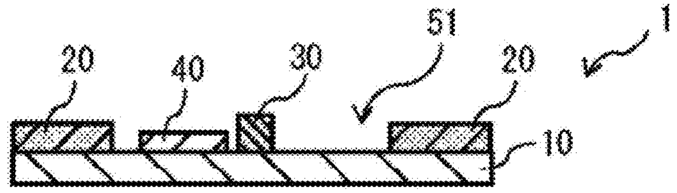
[ FIG. 12 ]
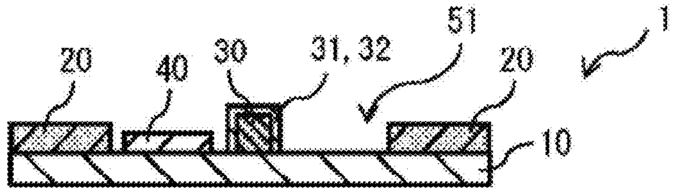

[ FIG. 13 ]
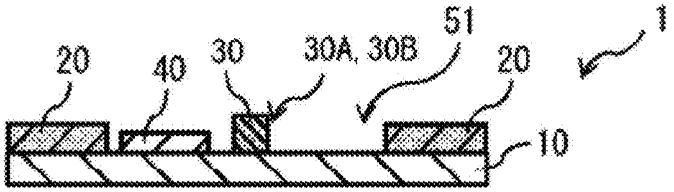
[ FIG. 14 ]
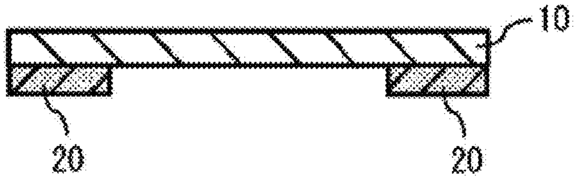
[ FIG. 15 ]
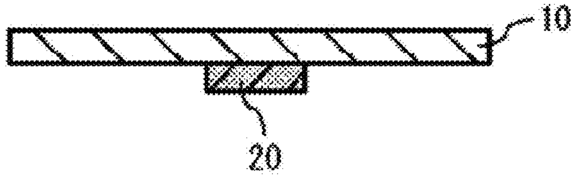
[ FIG. 16 ]
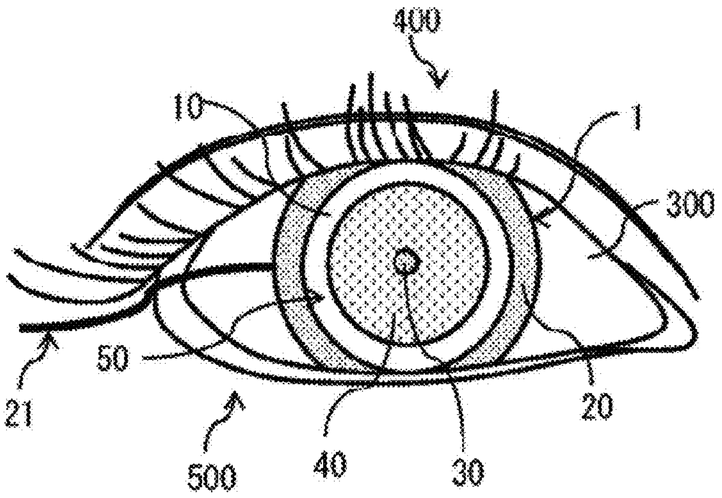

[ FIG. 17 ]
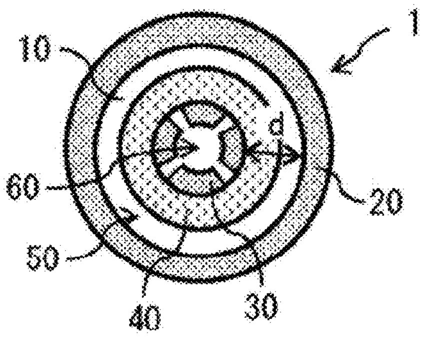
[ FIG. 18 ]
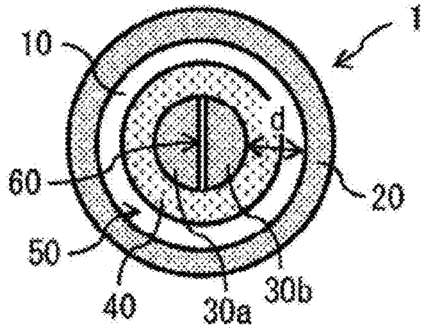
[ FIG. 19 ]
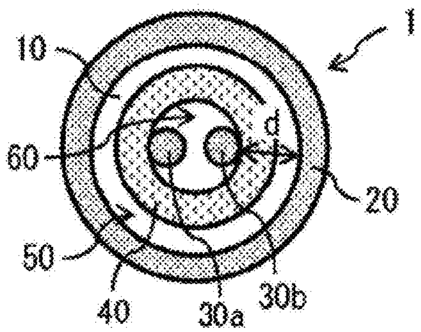

[ FIG. 20 ]
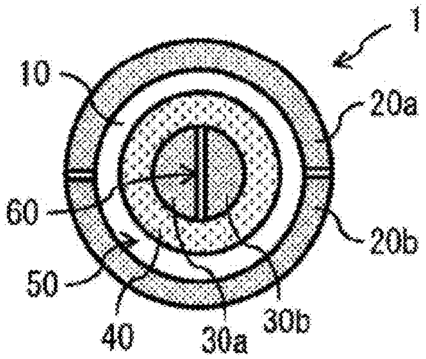
[ FIG. 21 ]
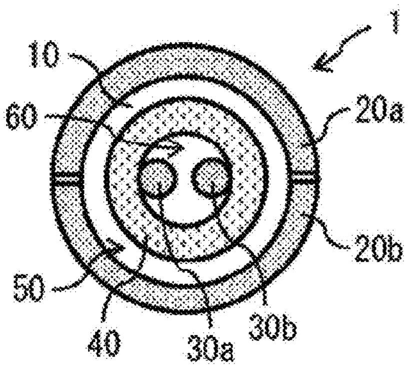
[ FIG. 22 ]
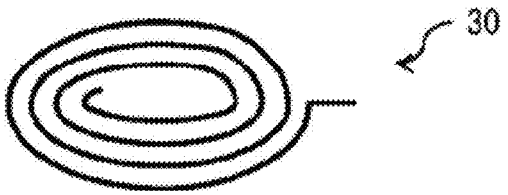
[ FIG. 23 ]
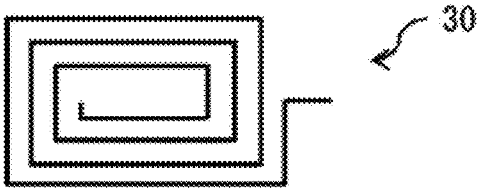

[ FIG. 24 ]
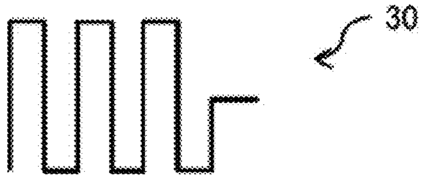
[ FIG. 25 ]
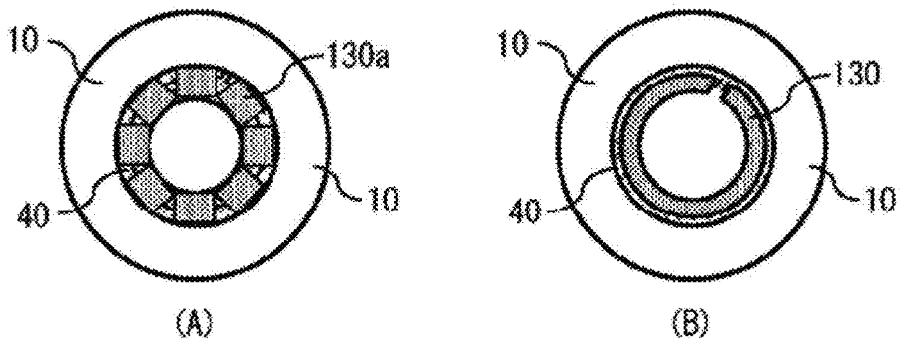
[ FIG. 26 ]
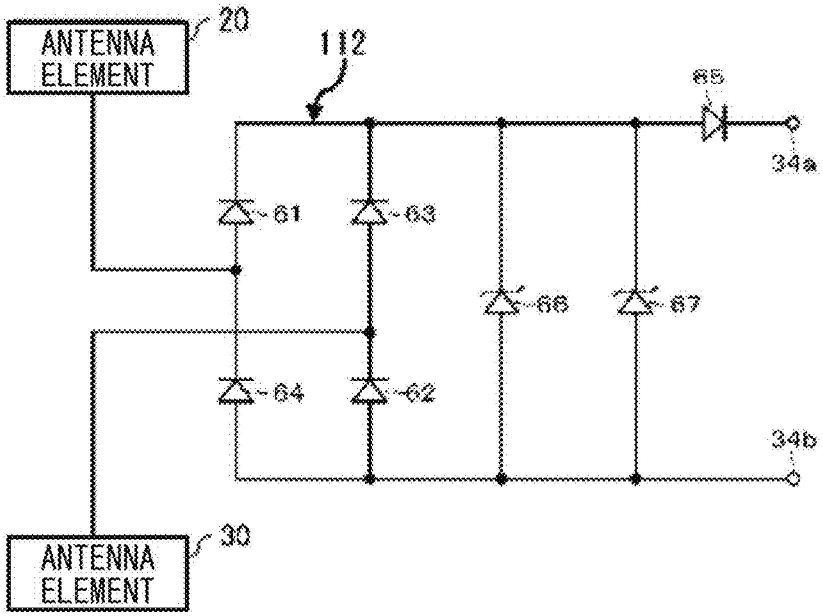

[ FIG. 27 ]
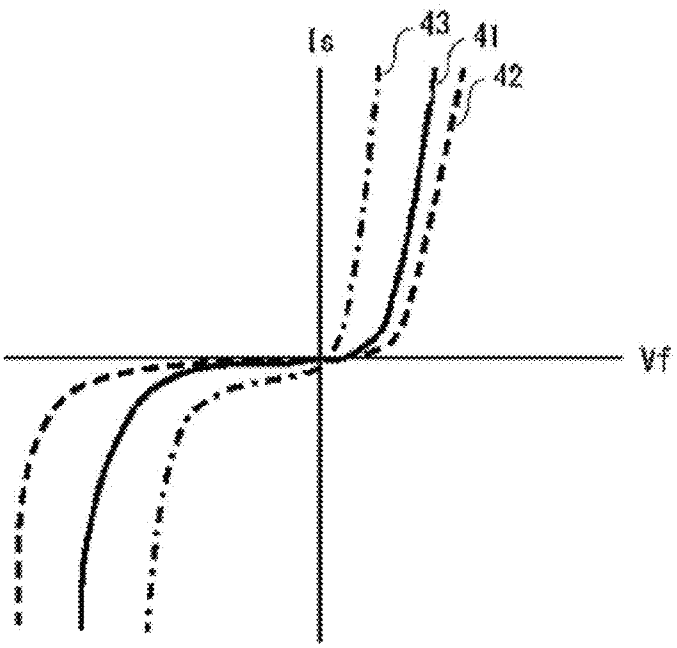
[ FIG. 28 ]
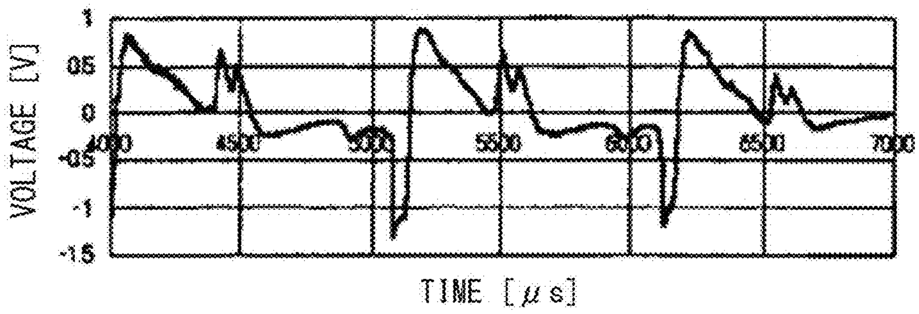

[ FIG. 29 ]
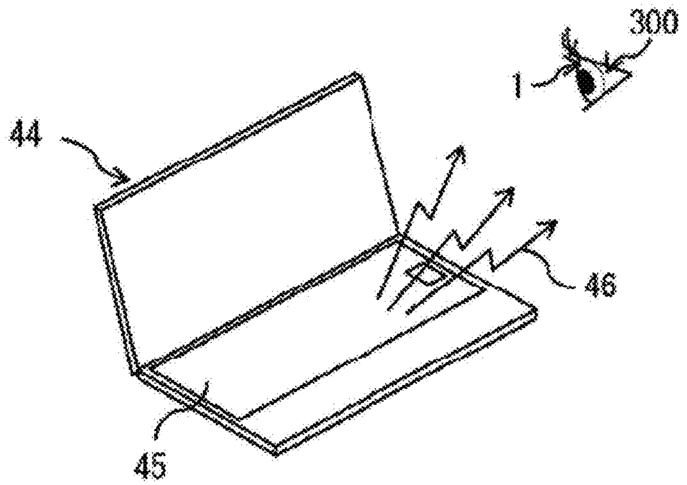
[ FIG. 30 ]
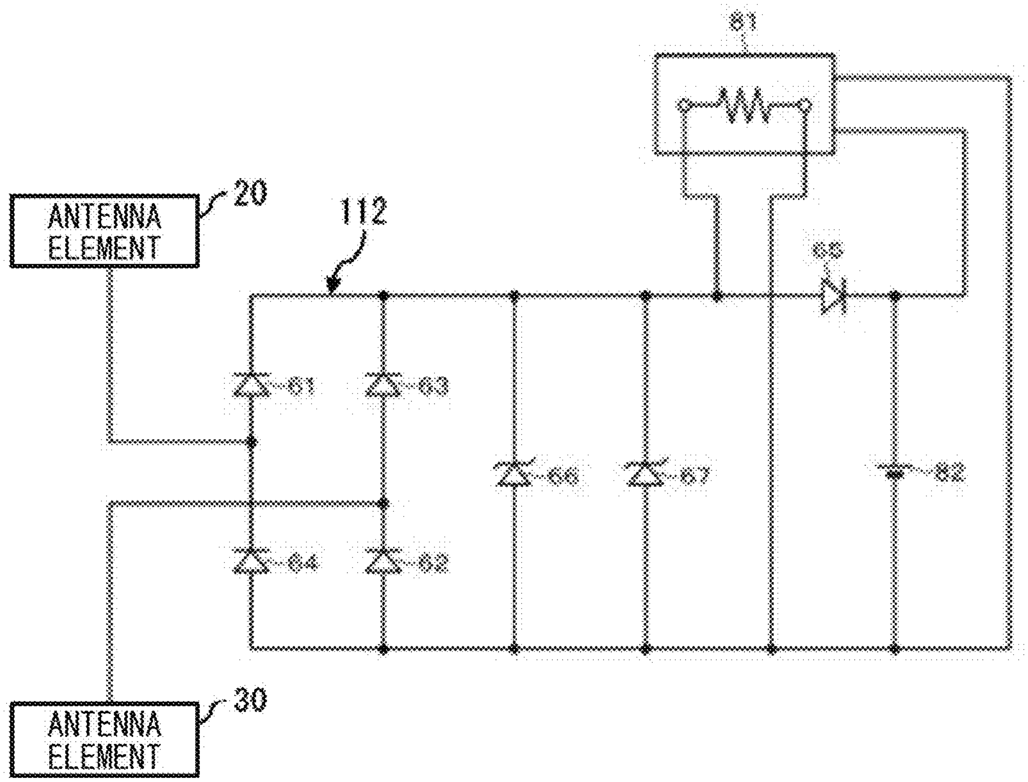

[ FIG. 31 ]
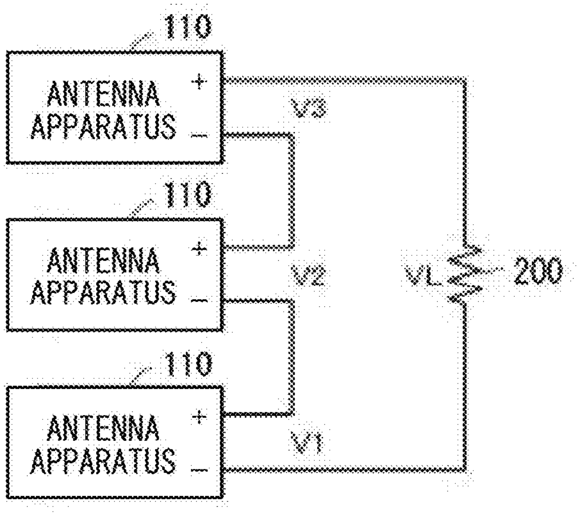
[ FIG. 32 ]
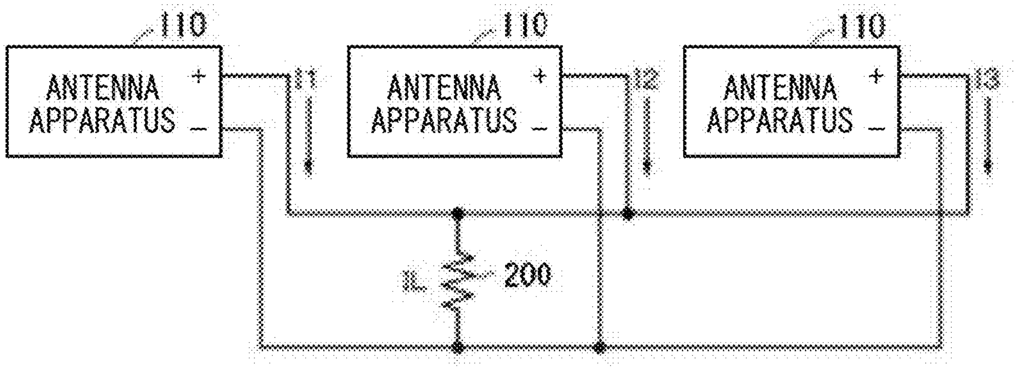

[ FIG. 33 ]
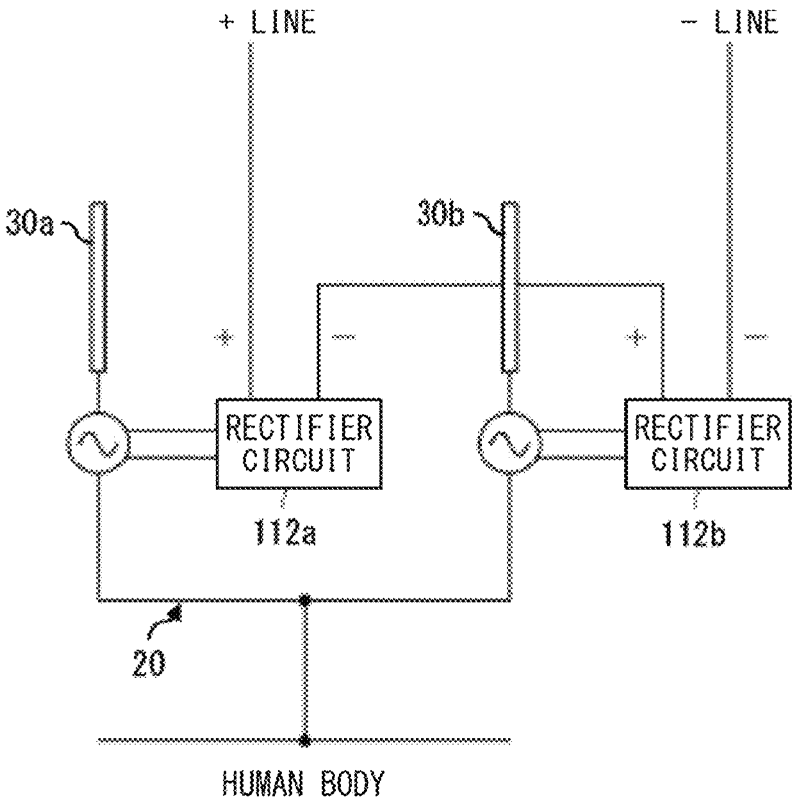

[ FIG. 34 ]
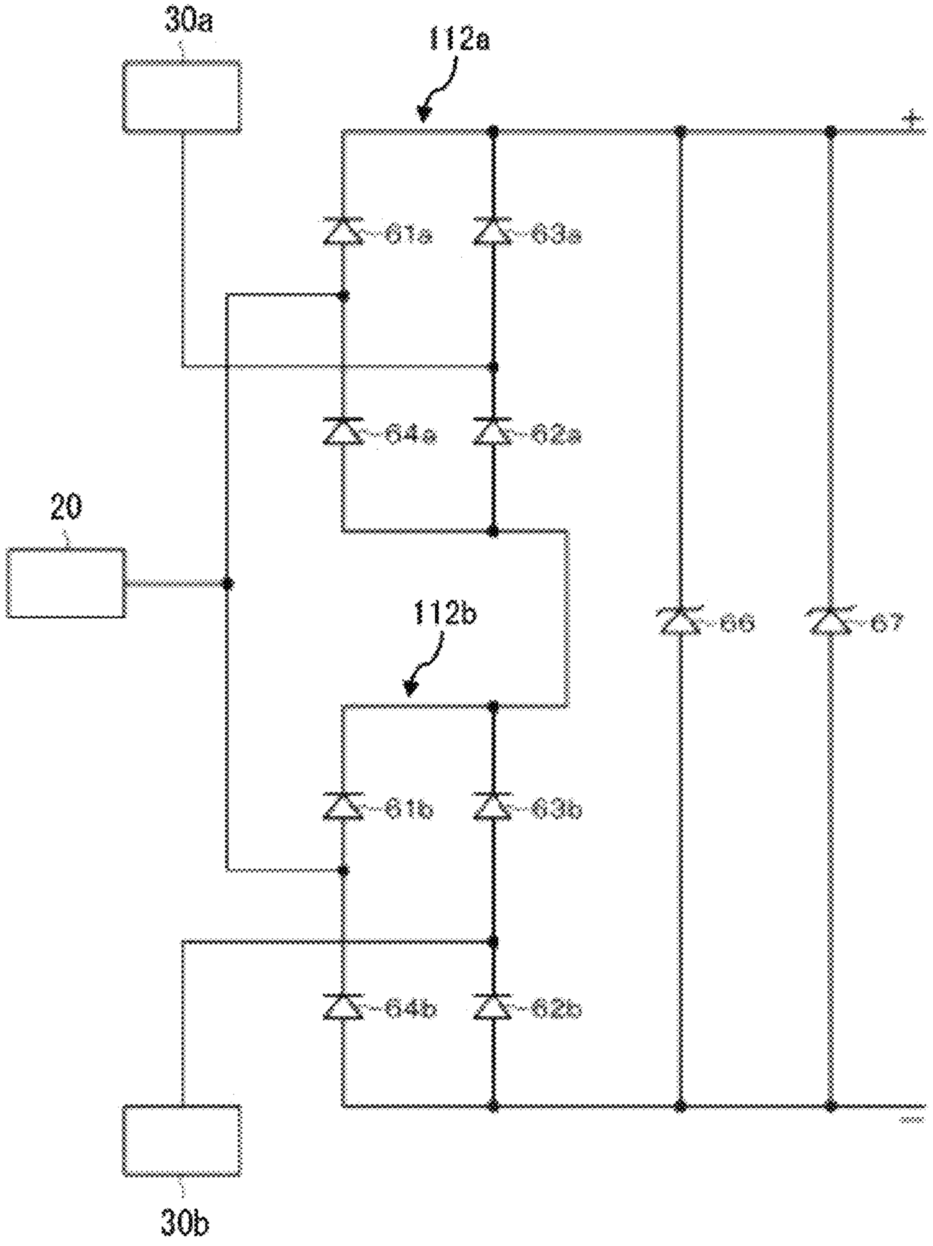

[ FIG. 35 ]
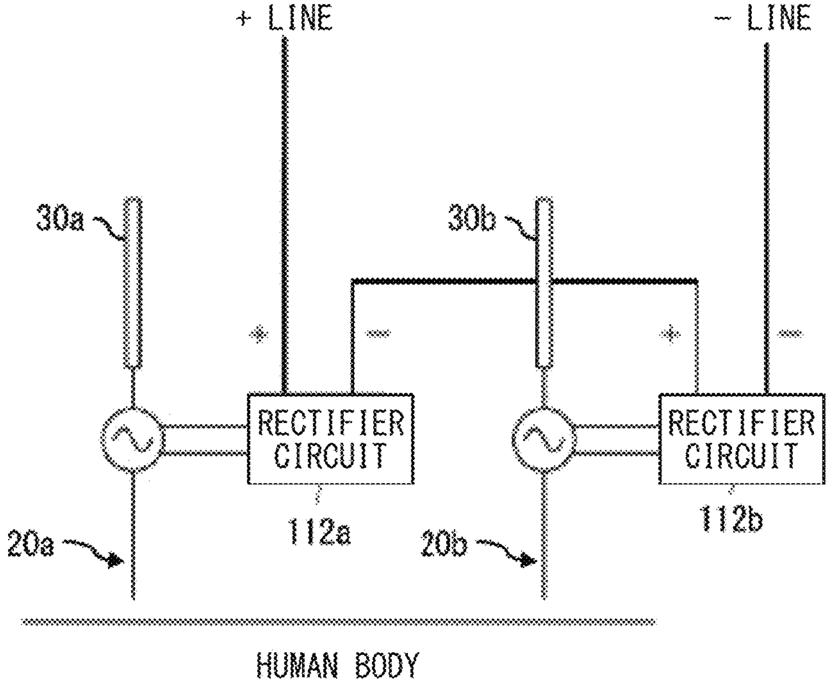

[ FIG. 36 ]
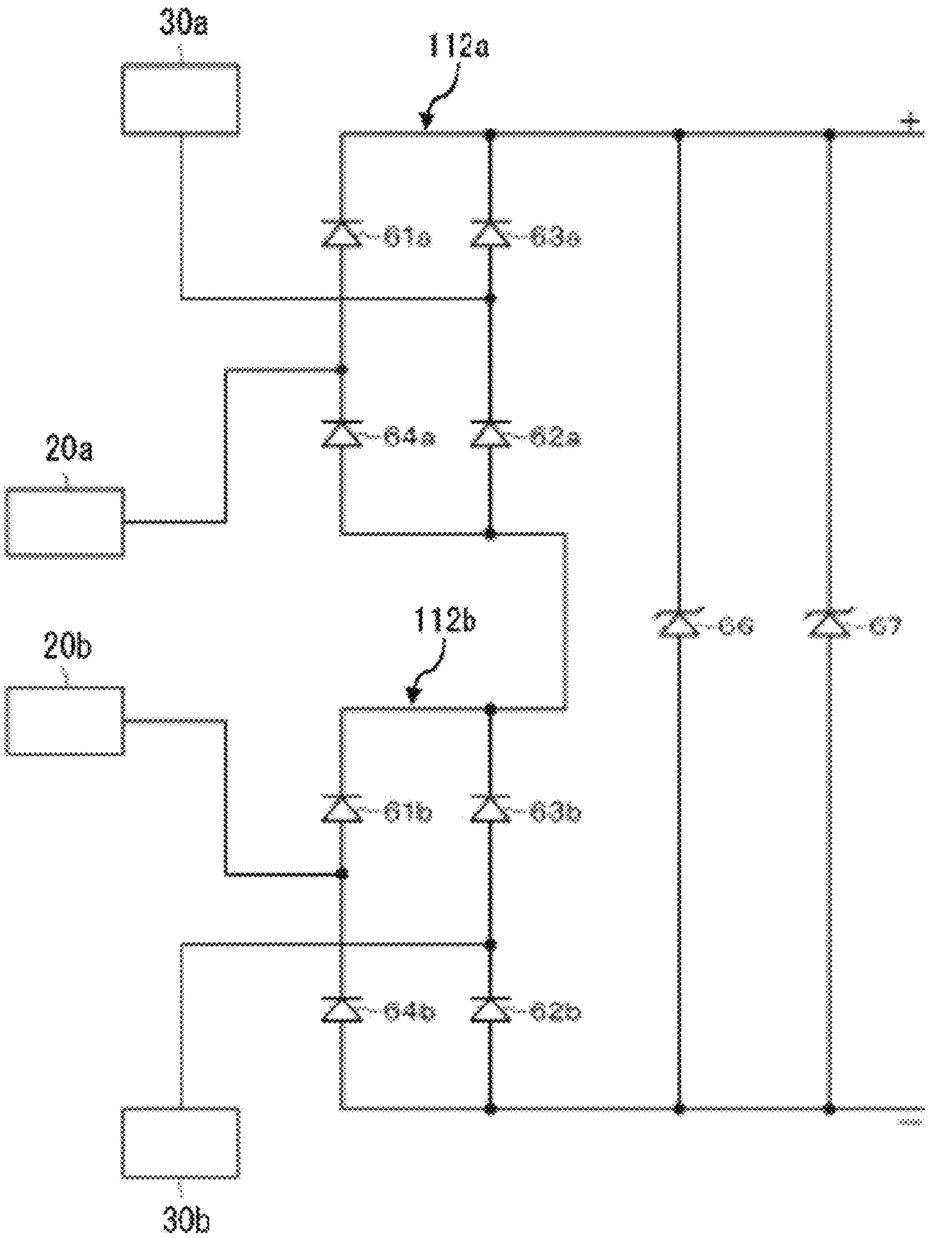

[ FIG. 37 ]
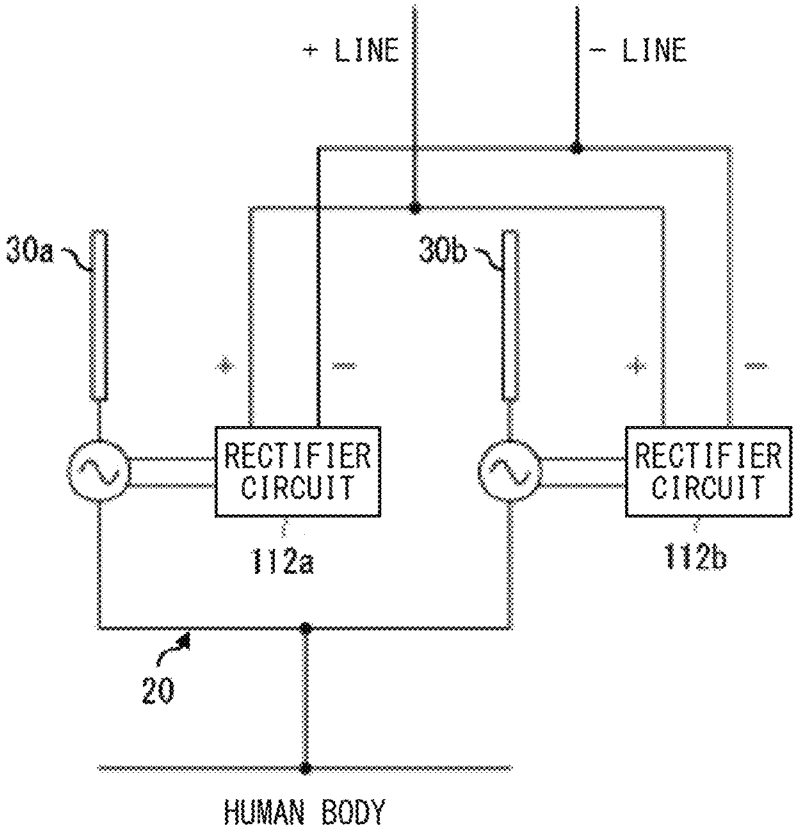

[ FIG. 38 ]
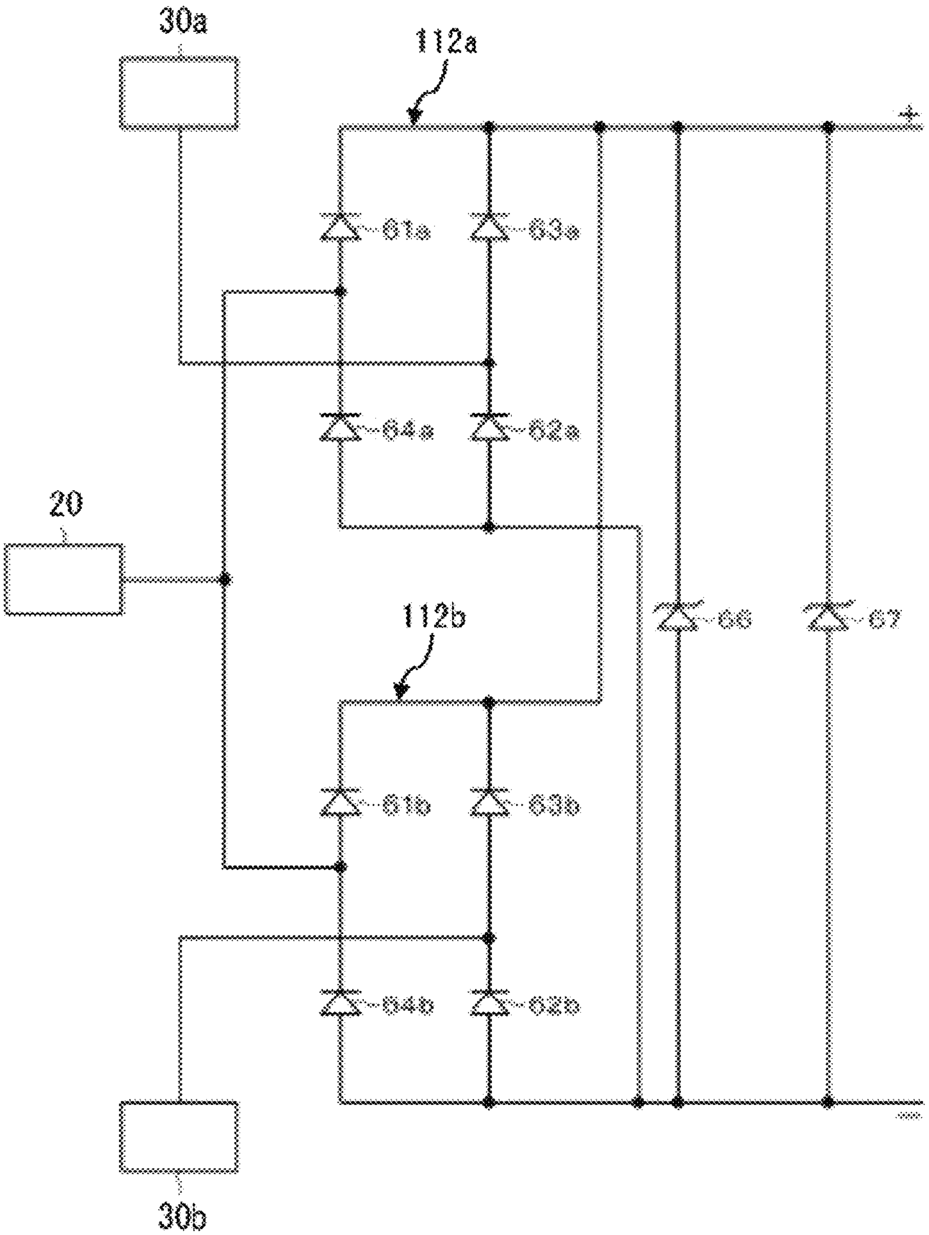

[ FIG. 39 ]
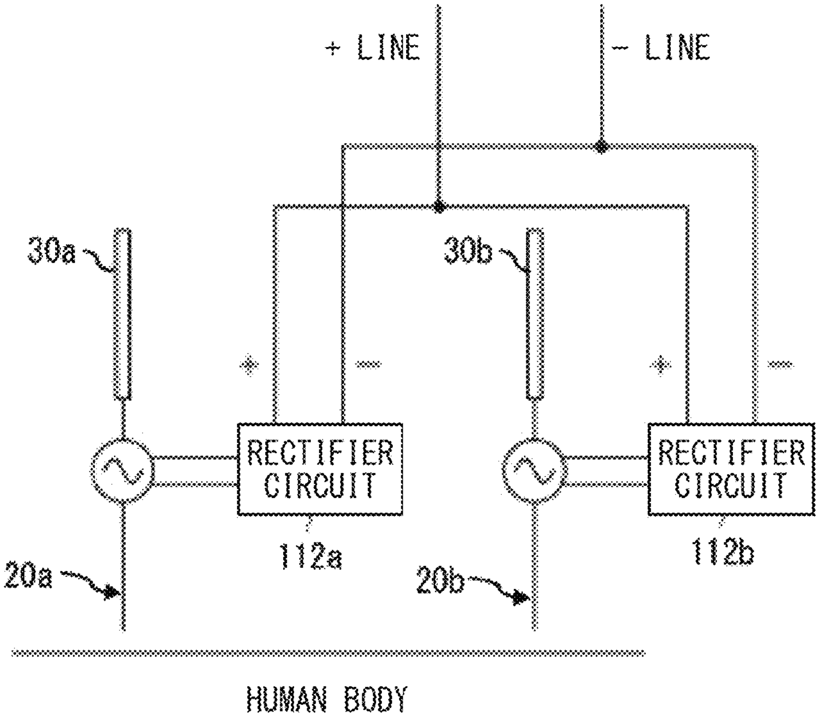

[ FIG. 40 ]
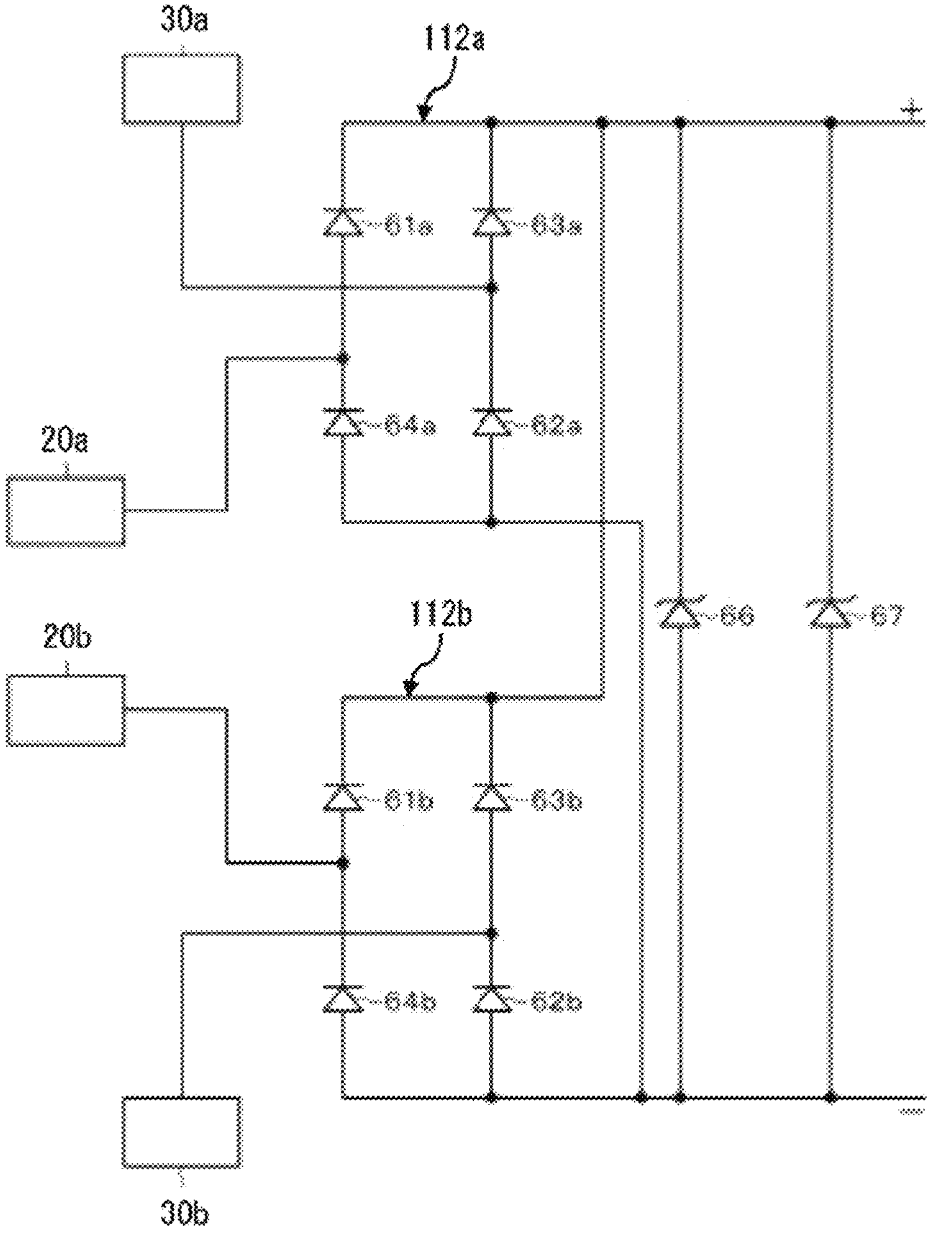

CONTACT LENS WITH TWO ANTENNA ELEMENTS

CROSS REFERENCE TO RELATED APPLICATIONS

This application is a U.S. National Phase of International Patent Application No. PCT/JP2022/011864 filed on Mar. 16, 2022, which claims priority benefit of Japanese Patent Application No. JP 2021-111775 filed in the Japan Patent Office on Jul. 5, 2021. Each of the above-referenced applications is hereby incorporated herein by reference in its entirety.

TECHNICAL FIELD

The present disclosure relates to a contact lens including an energy harvesting capability.

BACKGROUND ART

There has been an idea of converting energy of radio waves, such as airwaves, lying around us into electric power (energy harvesting). In the energy harvesting using existing radio waves, an antenna tuned to frequencies of radio waves to be received is formed to capture electric power existing in space, and a rectifier circuit is coupled to the antenna to accumulate energy (See Patent Literature, for example).

CITATION LIST

Patent Literature

PTL 1: Japanese Unexamined Patent Application Publication (Published Translation of PCT Application) No. 2003-088005

SUMMARY OF THE INVENTION

A method described in Patent Literature 1 has a disadvantage, however, that electric power to be captured as energy is limited. In a case where the method described in Patent Literature 1 is applied to a small device, such as a contact lens, in particular, it is difficult to receive sufficient electric power. Therefore, it is desired to provide a contact lens that is able to receive sufficient electric power.

A contact lens according to one embodiment of the present disclosure includes a lens substrate to be worn on an eyeball, an antenna unit that is provided on the lens substrate and receives alternating-current energy through a human body, and a load that receives electric power supplied from the antenna unit. The antenna unit includes a first antenna element including a first conductor and a second antenna element including a second conductor. The first conductor is provided at a position that is in contact with the eyeball or an eyelid when an eye is open. The second conductor is provided at a position that is separated from the first conductor by a predetermined gap and not in contact with the eyeball or the eyelid when the eye is open.

In the contact lens according to one embodiment of the present disclosure, the first conductor of the first antenna element is provided on the lens substrate at the position that is in contact with the eyeball or the eyelid when the eye is open. The second conductor of the second antenna element is provided on the lens substrate at the position that is separated from the first conductor by the predetermined gap and not in contact with the eyeball or the eyelid when the eye is open. This makes it possible to receive, for example, electric field energy of radio waves or quasi-electrostatic fields (near field) existing in space, through the eyeball or the eyelid. It is also possible to receive, for example, alternating-current energy outputted from a wearable device such as a wristwatch, through the eyeball or the eyelid.

BRIEF DESCRIPTION OF DRAWING

FIG. 1 is a diagram illustrating a functional block of a receiver apparatus provided in a contact lens according to one embodiment of the present disclosure.

FIG. 2 is a diagram illustrating an example of how the contact lens on which the receiver apparatus of FIG. 1 is provided is worn in an eye.

FIG. 3 is a diagram illustrating an example of layout of a circuit components of the receiver apparatus provided on the contact lens of FIG. 2.

FIG. 4 is a diagram illustrating an example of layout of the circuit components of the receiver apparatus provided on the contact lens of FIG. 2.

FIG. 5 is a diagram illustrating an example of a cross-sectional configuration of the contact lens of FIG. 3.

FIG. 6 is a diagram illustrating an example of a cross-sectional configuration of the contact lens of FIG. 4.

FIG. 7 is a diagram illustrating a modification example of the cross-sectional configuration of the contact lens of FIG. 3.

FIG. 8 is a diagram illustrating a modification example of the cross-sectional configuration of the contact lens of FIG. 3.

FIG. 9 is a diagram illustrating a modification example of the cross-sectional configuration of the contact lens of FIG. 3.

FIG. 10 is a diagram illustrating a modification example of the cross-sectional configuration of the contact lens of FIG. 3.

FIG. 11 is a diagram illustrating a modification example of the cross-sectional configuration of the contact lens of FIG. 3.

FIG. 12 is a diagram illustrating a modification example of the cross-sectional configuration of the contact lens of FIG. 3.

FIG. 13 is a diagram illustrating a modification example of the cross-sectional configuration of the contact lens of FIG. 3.

FIG. 14 is a diagram illustrating a modification example of the cross-sectional configuration of the contact lens of FIG. 3.

FIG. 15 is a diagram illustrating a modification example of the cross-sectional configuration of the contact lens of FIG. 3.

FIG. 16 is a diagram illustrating a modification example of the contact lens of FIG. 3.

FIG. 17 is a diagram illustrating a modification example of the contact lens of FIG. 3.

FIG. 18 is a diagram illustrating a modification example of the contact lens of FIG. 3.

FIG. 19 is a diagram illustrating a modification example of the contact lens of FIG. 3.

FIG. 20 is a diagram illustrating a modification example of the contact lens of FIG. 3.

FIG. 21 is a diagram illustrating a modification example of the contact lens of FIG. 3.

FIG. 22 is a diagram illustrating a modification example of an antenna element of FIG. 3.

FIG. 23 is a diagram illustrating a modification example of the antenna element of FIG. 3.

FIG. 24 is a diagram illustrating a modification example of the antenna element of FIG. 3.

FIG. 25 is a diagram illustrating an example of a schematic configuration of an electricity storage unit of FIG. 1.

FIG. 26 is a diagram illustrating an example of a circuit configuration of a rectifier circuit of FIG. 1.

FIG. 27 is a diagram for describing characteristics of diodes of FIG. 26.

FIG. 28 is a diagram illustrating an example of a waveform of a voltage generated in a human body.

FIG. 29 is a diagram illustrating an application example in which the present disclosure is applied to operations of a notebook-size personal computer.

FIG. 30 is a diagram illustrating a modification example of the circuit configuration of the rectifier circuit of FIG. 1.

FIG. 31 is a diagram illustrating a configuration example for increasing output of the receiver apparatus of FIG. 1.

FIG. 32 is a diagram illustrating a configuration example for increasing the output of the receiver apparatus of FIG. 1.

FIG. 33 is a diagram illustrating a configuration example in which the rectifier circuit of FIG. 1 is coupled in series.

FIG. 34 is a diagram illustrating a circuit configuration example of the rectifier circuit of FIG. 33.

FIG. 35 is a diagram illustrating a configuration example in which the rectifier circuit of FIG. 1 is coupled in series.

FIG. 36 is a diagram illustrating a circuit configuration example of the rectifier circuit of FIG. 35.

FIG. 37 is a diagram illustrating a configuration example in which the rectifier circuit of FIG. 1 is coupled in parallel.

FIG. 38 is a diagram illustrating a circuit configuration example of the rectifier circuit of FIG. 37.

FIG. 39 is a diagram illustrating a configuration example in which the rectifier circuit of FIG. 1 is coupled in parallel.

FIG. 40 is a circuit configuration example of the rectifier circuit of FIG. 39.

MODES FOR CARRYING OUT THE INVENTION

In the following, some embodiments will be described in detail with reference to the drawings.

[Configuration]

A description is given of a contact lens 1 according to one embodiment of the present disclosure. FIG. 1 illustrates a functional block of a receiver apparatus 100 provided in the contact lens 1. FIG. 2 illustrates an example of how the contact lens 1 on which the receiver apparatus 100 of FIG. 1 is provided is worn on an eyeball 300. FIG. 3 and FIG. 4 each illustrate an example of layout of circuit components of the receiver apparatus 100 provided on the contact lens 1 of FIG. 2.

The receiver apparatus 100 includes an antenna apparatus 110. The antenna apparatus 110 has an antenna unit 111 and a rectifier circuit 112. The antenna unit 111 receives, for example, electric field energy of radio waves or quasi-electrostatic fields (near field) existing in space, through a human body (for example, an upper eyelid 400 and a lower eyelid 500). The antenna unit 111 receives, for example, alternating-current electric energy outputted from a wearable device such as a wristwatch, through the human body (for example, the upper eyelid 400 and the lower eyelid 500). In any case, the antenna unit 111 receives the alternating-current energy through the human body. The rectifier circuit 112 rectifies the alternating-current energy received by the antenna unit 111 and outputs direct-current energy thereby obtained to a subsequent stage.

There is a large amount of electric filed energy around us, and it is possible to divide the electric filed energy into low frequency components and high frequency components. Examples of the low frequency components include leak electric fields from household alternating-current power source, noise existing near personal computers, voltages generated when people are walking, or the like. These are referred to as quasi-electrostatic fields. In contrast, radio broadcasting, television broadcasting, mobile phone radio waves, or the like, are the high frequency components. These are referred to as radio waves.

The receiver apparatus 100 further includes a charger unit 120 and an electricity storage unit 130. The charger unit 120 outputs, to the electricity storage unit 130, direct-current energy inputted from the rectifier circuit 112. The charger unit 120 may control discharging of the direct-current energy stored in the electricity storage unit 130. The electricity storage unit 130 includes, for example, at least one of a capacitor or a battery, the capacitor being able to temporarily store the direct-current energy. In the electricity storage unit 130, the direct-current energy inputted from the charger unit 120 is stored temporarily. In a case where the electricity storage unit 130 includes the capacitor and the battery, the electricity storage unit 130 may store, in the capacitor, the direct-current energy from the charger unit 120, and may store, in the battery, the direct-current energy that the capacitor is not able to store. For example, a load 200 is coupled to the electricity storage unit 130. The load 200 includes, for example, a microcontroller, a wireless communication unit, and a sensor, or the like. By the direct-current energy stored in the electricity storage unit 130 being supplied to the load 200, the microcontroller controls the wireless communication unit and the sensor, and output of the sensor is outputted to outside via the wireless communication unit. The load 200 corresponds to a specific example of the "load" of the present disclosure.

As illustrated in FIG. 3, for example, the antenna unit 111 has two antenna elements 20 and 30. The antenna element 20 includes a conductor (hereinafter referred to as a "first conductor") provided at a position in contact with the eyelid (at least one of the upper eyelid 400 or the lower eyelid 500) when the eye is open. The first conductor is in contact with the eyelid (at least one of the upper eyelid 400 or the lower eyelid 500) directly or via some layer both when the eye is open and when the eye is closed. The antenna element 20 receives, from the antenna element 30, for example, the electric field energy of the radio waves or the quasi-electrostatic fields (near field) existing in space, through the eyelid (at least one of the upper eyelid 400 or the lower eyelid 500). The antenna element 20 receives, from the antenna element 30, for example, the alternating-current electric energy outputted from the wearable device such as the wristwatch. In any case, the antenna elements 20 and 30 receive the alternating-current energy through the human body.

The antenna element 30 includes a conductor (hereinafter referred to as a "second conductor") provided at a position separated from the first conductor by a predetermined gap d and not in contact with the eyelid (the upper eyelid 400 and the lower eyelid 500) when the eye is open. The second conductor is not in contact with the eyelid (the upper eyelid 400 and the lower eyelid 500) when the eye is open, and comes in contact with the eyelid (the upper eyelid 400 and the lower eyelid 500) directly or via some layer when the eye is closed. The antenna element 30 is capacitively coupled with the earth.

The first conductor is, for example, a conductor such as gold, silver, aluminum, copper, iron, nickel, or an alloy, and has a plate shape, for example. The first conductor may also be, for example, a conductive resin mixed with carbon or metal or the like, or a material such as a conductive rubber that conducts electricity. The antenna element 20 may further have a resin coating layer covering the first conductor. The resin coating layer prevents the first conductor from corroding due to contact with moisture such as tears, or the like. The second conductor is, for example, a conductor such as gold, silver, aluminum, copper, iron, nickel, or an alloy, and has a plate shape, for example. The second conductor may also be, for example, a conductive resin mixed with carbon or metal or the like, or a material such as a conductive rubber that conducts electricity.

A circuit unit 40 includes a circuit of the antenna apparatus 110 excluding the two antenna elements 20 and 30, the charger unit 120, and the electricity storage unit 130. The circuit unit 40 may further include the load 200, for example.

There is the predetermined gap d between the first conductor and the second conductor in a planar view. That is, the first conductor and the second conductor are disposed so as not to overlap each other in a planar view. In addition, for example, there may be a gap 50 between the circuit unit 40 and the first conductor in a planar view. That is, the circuit unit 40 and the first conductor may be disposed not to overlap each other in a planar view. The antenna element 30 may be provided in a circuit chip in which the circuit unit 40 is formed. The antenna element 30 (second conductor) has a shape that is not specifically limited. The antenna element 30 (second conductor) may have, for example, a circular shape as illustrated in FIG. 3, for example, an annular shape as illustrated in FIG. 4, or a C-shape. The antenna element 30 (second conductor) may have, for example, a square shape, a polygonal shape, a square ring shape, or a polyangular ring shape. The gap d between the first conductor and the second conductor may be constant independently of a location or may vary depending on a location.

In a case where the antenna element 30 (second conductor) has a circular shape, it is preferable that the antenna element 30 (second conductor) be provided at a middle of the lens substrate 10. In a case where the antenna element 30 (second conductor) has an annular shape, it is preferable that the antenna element 30 (second conductor) be provided in a ring-shaped region centering on the middle of the lens substrate 10. In a case where the antenna element 30 (second conductor) has the annular shape, an opening 60 as illustrated in FIG. 4, for example, is formed at the middle of the antenna element 30 (second conductor). It is preferable that the antenna element 20 be provided, for example, on an outer edge of the lens substrate 10.

FIG. 5 illustrates a cross-sectional configuration example of the contact lens 1 of FIG. 3. FIG. 6 illustrates a cross-sectional configuration example of the contact lens 1 of FIG. 4. It is to be noted that the contact lens 1 would normally have an arcuate shape along a surface shape of an eyeball 300, but the contact lens 1 is simply represented in a straight line in FIG. 5 and FIG. 6 (as well as FIG. 7 to FIG. 15 as further described below).

As illustrated in FIG. 5 and FIG. 6, for example, the contact lens 1 includes the lens substrate 10, the antenna elements 20 and 30 provided on a surface of the lens substrate 10 on side of the upper eyelid 400, and the circuit unit 40. The lens substrate 10 includes, for example, a resin substrate having a curved shape along a surface of a pupil 310 and a surface of an iris 320 of the surface of the eyeball 300. Examples of resin materials used for the lens substrate 10 include methyl methacrylate (MMA), siloxanyl methacrylate (SMA), fluoromethacrylate F (FMA), hydroxyethyl methacrylate (HEMA), N-vinylpyrrolidone (N-VP), dimethylacrylamide (DMAA), glycerol methacrylate (GMA), silicone rubber, butyl acrylate, dimethylsiloxane, collagen, amino acid copolymers, or the like.

As illustrated in FIG. 7, for example, the antenna element 30 or the circuit unit 40 may be provided on the surface of the lens substrate 10 (rear surface of the lens substrate 10) on the side of the eyeball 300. At this time, in the antenna element 20, an opening 51 is provided on a location facing the antenna element 30 and the circuit unit 40. The antenna element 30 (second conductor) is covered with the circuit unit 40, for example. The circuit unit 40 prevents the antenna element 30 (second conductor) from contacting moisture such as tears. The circuit unit 40 has a thickness that allows for isolation from the human body. The circuit unit 40 may include, for example, an insulating material such as a resin, or may be such configured that a surface is covered with an insulating layer formed of resin, or the like. The antenna element 30 (second conductor) may be covered with, for example, a resin that is separate from the circuit unit 40. It is to be noted that in FIG. 7, a portion of the lens substrate 10 that corresponds to the antenna element 30 may be a conductor.

As illustrated in FIG. 8, for example, the antenna element 30 may be disposed in the lens substrate 10. As illustrated in FIG. 8, for example, the circuit unit 40 may be disposed on the surface of the lens substrate 10 or may be disposed in the lens substrate 10.

As illustrated in FIG. 9, for example, the antenna element 30 or the circuit unit 40 may be covered with an insulating layer 70. The insulating layer 70 is formed so as to fill the opening 51 of the antenna element 20, for example, and includes a resin, or the like, for example.

As illustrated in FIG. 10, for example, the antenna element 30 or the circuit unit 40 may be covered with a water repellant layer 71 that has water repellency to moisture such as tears. The water repellant layer 71 includes, for example, a material containing functional groups such as saturated fluoroalkyl groups (trifluoromethyl groups CF3—, in particular), alkylsilyl groups, fluorosilyl groups, or long-chain alkyl groups. As illustrated in FIG. 10, for example, the antenna element 30 or the circuit unit 40 may be covered with a hydrophobic layer 72 that has hydrophobic property to moisture such as tears. The hydrophobic layer 72 includes, for example, a lipophilic material, silicone or, a compound having a fluoroalkyl chain, or the like. It is to be noted that the surfaces of the antenna element 30 or the circuit unit 40 may be subjected to water repellant treatment (plasma treatment, for example).

As illustrated in FIG. 11, for example, the antenna element 30 (second conductor) may have a height from the surface of the lens substrate 10 that is higher than a height of the antenna element 20 (first conductor) from the surface of the lens substrate 10. In such a case, it is possible to make it difficult for the surface of the antenna element 30 (second conductor) to be covered by moisture such as tears. As illustrated in FIG. 12, for example, the antenna element 30 may be covered with a water repellant layer 31 that has the hydrophobic property to moisture such as tears. As illustrated in FIG. 12, for example, the antenna element 30 or the circuit unit 40 may be covered with a hydrophobic layer 32 that is hydrophobic to moisture such as tears. The water repellant layer 31 has a similar configuration to the water repellant layer 71, for example. The hydrophobic layer 32 has a similar configuration to the hydrophobic layer 72.

As illustrated in FIG. 13, on the surface of the antenna element 30 (second conductor), a water repellant structure may be formed by the water repellant treatment. As illustrated in FIG. 13, for example, on the surface of the antenna element 30 (second conductor), a hydrophobic structure may be formed by hydrophobic treatment. The water repellant structure or the hydrophobic structure includes, for example, a lotus leaf structure. The lotus leaf structure includes, for example, an irregular surface on which fine protrusions of μm order are arranged. On this irregular surface, a large number of nanosized protrusions is formed on each protrusion.

[Effects]

In the following, a description is given of effects of the contact lens 1 according to the present embodiment.

In the present embodiment, the first conductor of the antenna element 20 is provided on the lens substrate 10 at the position that is in contact with the eyeball or the eyelid when the eye is open. The second conductor of the antenna element 30 is provided on the lens substrate 10 at the position that is separated from the first conductor by the predetermined gap and not in contact with the eyeball or the eyelid when the eye is open. This makes it possible to receive, for example, the electric field energy of the radio waves or the quasi-electrostatic fields (near fields) existing in space, through the eyeball or the eyelid. It is also possible to receive, for example, the alternating-current energy outputted from the wearable device such as the wristwatch, through the eyeball or the eyelid. As a result, the contact lens 1 is able to receive sufficient electric power.

In the present embodiment, the first conductor is provided on the outer edge of the lens substrate 10. This ensures that it is possible to bring the first conductor into contact with the eyeball or the eyelid. As a result, it is possible to provide the contact lens 1 with high antenna performance.

In the present embodiment, the second conductor is provided at the middle of the lens substrate 10 or in the ring-shaped region centering on the middle of the lens substrate 10. This ensures that it is possible to provide the gap d between the first conductor and the second conductor. As a result, it is possible to provide the contact lens 1 with the high antenna performance.

In the present embodiment, the first conductor is provided on a surface of the lens substrate 10 on the side of the eyelid. This ensures that it is possible to bring the first conductor into contact with the eyelid.

In the present embodiment, the second conductor is provided on the surface of the lens substrate 10 on the side of the eyelid or on the surface opposite to the eyelid or within the lens substrate 10. This ensures that it is possible to capacitively couple the second conductor and the earth.

In the present embodiment, the insulating layer 70, the water repellant layer 71, the hydrophobic layer 72, the water repellant layer 31, or the hydrophobic layer 32 is provided to cover the second conductor, the surface of the second conductor is subjected to the water repellant treatment or the hydrophobic treatment, or the water repellant structure or the hydrophobic structure is formed on the surface of the second conductor. This makes it possible to prevent the surface of the second conductor from coming into direct contact with moisture such as tears. As a result, the second antenna element (second conductor) is able to form a pseudo-ground through the capacitive coupling with the earth.

In the present embodiment, the antenna element 30 (second conductor) has the height from the lens substrate 10 that is higher than the height of the antenna element 20 (first conductor) from the surface of the lens substrate 10. As a result, it is possible to make it difficult for the surface of the antenna element 30 (second conductor) to be covered with moisture such as tears. As a result, the antenna element 30 (second conductor) is able to form the pseudo-ground through the capacitive coupling with the earth.

In the present embodiment, the rectifier circuit 112 is provided. This makes it possible to store, in an electricity storage unit 130, the direct-current energy generated by the rectifier circuit 112, or to supply the direct-current energy stored in the electricity storage unit 130 to the load 200.

In the present embodiment, the capacitor is provided that stores a direct-current signal obtained through rectification of the rectifier circuit 112. This makes it possible to supply the direct-current energy stored in the capacitor to the load 200.

2. MODIFICATION EXAMPLES

In the following, a description is given of the contact lens 1 according to the one embodiment of the present disclosure.

Modification Example A

In the above embodiment, the antenna element 20 may have a conductor provided at the position in contact with the eyeball 300. At this time, the antenna element 20 may have a conductor provided on the rear surface of the lens substrate 10 (surface on the side of the eyeball 300), as illustrated in FIG. 14 and FIG. 15, for example. The above conductor includes, for example a material common to the first conductor described above. As illustrated in FIG. 14, for example, the above conductor may be provided on the outer edge portion of the rear surface of the lens substrate 10. As illustrated in FIG. 15, for example, the above conductor may be provided at a middle portion of the rear surface of the lens substrate 10. It is to be noted that in FIG. 14 and FIG. 15, notations of configurations other than the lens substrate 10 and the antenna element 20 are omitted. In this modification example, the antenna element 30 may be provided on an upper surface of the lens substrate 10 at the position not in contact with the eyelid when the eye is open. This is because the antenna element 20 is provided on the rear surface of the lens substrate 10 and does not exist at a position that blocks the capacitive coupling between the antenna element 30 and the earth.

In this modification example, the antenna element 20 receives, for example, the electric field energy of the radio waves or the quasi-electrostatic fields (near fields) existing in space, through the eyeball 300. The antenna element 20 receives, for example, the alternating-current electric energy outputted from the wearable device such as the wristwatch, through the eyeball 300. In any case, the antenna element 20 receives the alternating-current energy through the human body. As such, in this modification example, the antenna element 20 acquires the electric field energy through the eyeball 300. Even in such a case, the contact lens 1 is able to receive sufficient electric power.

Modification Example B

In the above-described embodiment and the modification examples of the above-described embodiment, the antenna element 20 may have an extraction electrode 21 in contact with a conductor that contacts the upper eyelid 400, the lower eyelid 500, or the eyeball 300, as illustrated in FIG. 16, for example. The extraction electrode 21 is a wiring-like electrode that may reach a face surface from the surface of the lens substrate 10, and is in contact with the face surface. In such a case, it is possible to receive, for example, the electric field energy of the radio waves or the quasi-electrostatic fields (near fields) existing in space, through the extraction electrode 21, when the extraction electrode 21 is in contact with a face skin. It is also possible to receive, for example, the alternating-current energy outputted from the wearable device such as the wristwatch, through the extraction electrode 21. As a result, the contact lens 1 is able to receive sufficient electric power.

Modification Example C

In the above-described embodiment and the modification examples of the above-described embodiment, the antenna element 30 may be divided into a plurality of elements, as illustrated in FIG. 17, FIG. 18, and FIG. 19, for example. In a case where the antenna element 30 has two elements 30*a* and 30*b*, as illustrated in FIG. 18 and FIG. 19, for example, the two elements 30*a* and 30*b* may be coupled to the common rectifier circuit 112 or may be coupled to the mutually different rectifier circuits 112. Although a shape of the two elements 30*a* and 30*b* is not specifically limited, the shape may be semispherical, as illustrated in FIG. 18, for example, or may be circular, as illustrated in FIG. 19, for example. A description of a case where the two elements 30*a* and 30*b* are coupled to the mutually different rectifier circuits 112 is given below.

In this modification example, the antenna element 20 may be divided into a plurality of elements, as illustrated in FIG. 20 and FIG. 21, for example. When the antenna element 20 has two elements 20*a* and 20*b*, as illustrated in FIG. 20 and FIG. 21, for example, the two elements 20*a* and 20*b* may be coupled to the common rectifier circuit 112, or may be coupled to the mutually different rectifier circuits 112. Although a shape of the two element 20*a* and 20*b* is not specifically limited, the shape may be semispherical, as illustrated in FIG. 20, for example, or may be circular, as illustrated in FIG. 21, for example. A description of a case where the two elements 20*a* and 20*b* are coupled to the mutually different rectifier circuits 112 is given below.

Modification Example D

In the above-described embodiment and the modification examples of the above-described embodiment, the antenna element 30 may have a spiral shape, as illustrated in FIG. 22 and FIG. 23, for example. The antenna element 30 may have a single-layer spiral shape or a multiple-layer spiral shape. Although the spiral shape of the antenna element 30 is not specifically limited, the antenna element 30 may have an annular spiral shape without corners, as illustrated in FIG. 22, for example, or may have a square-ring spiral shape, as illustrated in FIG. 23, for example. In the above-described embodiment and the modification examples of the above-described embodiment, the antenna element 30 may have a meandering shape (rectangular wave shape), as illustrated in FIG. 24, for example. As seen from these, increasing a length of the antenna element strengthens the capacitive coupling between the antenna element 30 and the earth, thus allowing the antenna element 30 to form the pseudo-ground.

Modification Example E

In the above-described embodiment and the modification examples of the above-described embodiment, the electricity storage unit 130 may include capacitors 130*a* coupled in series to each other, as illustrated in FIG. 25(A), for example. At this time, the electricity storage unit 130 may further include a circuit that couples, in series, only one or more capacitors 130*a* that have not failed, for example, in a case where some of a plurality of the capacitors 130*a* have failed. In addition, in the above-described embodiment and the modification examples of the above-described embodiment, the electricity storage unit 130 may have a C-shape, as illustrated in FIG. 25(B), for example.

Modification Example F

In the above-described embodiment and the modification examples of the above-described embodiment, the rectifier circuit 112 may have, as illustrated in FIG. 26, for example, a rectifier circuit including four diodes 61 to 64, a varistor 66 against static electricity, and a Zener diode 67 for IC protection (a Zener voltage is 6.5V, for example).

The diode 61 and the diode 64 are coupled in series to each other, and the diode 63 and the diode 62 are coupled in series to each other. A coupling point between an anode of the diode 61 and a cathode of the diode 64 is coupled to the antenna element 20. A coupling point between an anode of the diode 63 and a cathode of the diode 62 is coupled to the antenna element 30. A coupling point between a cathode of the diode 61 and a cathode of the diode 63 is coupled to one output terminal 34*a* via a backflow prevention diode 65. A coupling point between an anode of the diode 64 and an anode of the diode 62 is coupled to another output terminal 34*b*. Between the output terminal 34*a* and the output terminal 34*b*, the varistor 66 against static electricity and the Zener diode 67 for IC protection are coupled in parallel to each other.

The four diodes 61 to 64 may be discrete or may be a dedicated IC. FIG. 27 illustrates measurement results of forward voltages Vf and backward currents Is of the four diodes 61 to 64 used in the rectifier circuit 112. As diode item number 1N60, silicon and germanium diodes were measured, and another diode item number ISS108 was evaluated using a germanium diode manufactured by a different manufacturer. In FIG. 27, a curve 42 represents characteristics of 1N60 (silicon), a curve 41 represents characteristics of 1N60 (germanium), and a curve 43 represents characteristics of ISS108 (germanium).

TABLE 1

| | Room Temperature | | Rectification |
|---|---|---|---|
| | Forward Voltage Vf [mV] | Backward Current Is [μA] | with the human body antenna |
| 1N60 (silicon) | 367 | 1 | Yes |
| 1N60 (germanium) | 303 | 7 | No |
| 1SS108 | 162 | 26 | No |

A current that flows when a voltage is applied to the four diodes 61 to 64 in a backward direction is backward current Is. Measurement data in Table 1 is data when 10V is applied to the diodes in the backward direction. The forward voltage Vf is a voltage when the forward current (1 mA) begins to flow to the diodes.

It has been found that in a case where outputs of the antenna elements 20 and 30 were rectified, the diode 1N60 (silicon) through which no current flowed in the backward direction was able to capture more electric power than the diode with a low voltage at which the current began to flow in a forward direction. Because input to be rectified is an alternating-current, the backward current Is when the forward voltage Vf of the diodes 61 to 64 is applied in the reverse direction is 10V in Table 1. Thus, in a case where the backward current Is when the same voltage as Vf is applied in the backward direction is calculated on the basis of this, the backward current Is is 0.036 μA for 1N60 (silicon), 0.21 μA for 1N60 (germanium), and 0.5 μA for ISS108 (germanium). Therefore, a ratio of the forward current (1 mA) to the backward current Is is calculated to be 1/27778 for 1N60 (silicon), 1/4762 for 1N60 (germanium), and 1/2000 for ISS108 (germanium). That is, it is necessary that the diodes 61 to 64 used in the rectifier circuit 112 have the above ratio of about 4700 times or more, and preferably, the above ratio is 10000 or more. As a result, of the three diodes cited as examples, 1N60 (silicon) has the most suitable characteristics.

Furthermore, in terms of the characteristics of the diodes 61 to 64, it is better that the backward current Is when applied in the backward direction is smaller. A backward resistance value calculated using the 10V data is 100 MΩ for 1N60 (silicon), 1.43 MΩ for 1N60 (germanium), and 0.38 M2 for ISS108 (germanium). That is, a diode having a larger resistance value that prevents a current from flowing in the backward direction is good. For the diodes 61 to 64 used in the rectifier circuit 112, it is necessary that the above resistance value be more than 1.43 MΩ and preferably 10 MΩ or more. As a result, of the three diodes cited as examples, IN60 (silicon) has the most suitable characteristics.

Modification Example G

In the above-described embodiment and the modification examples of the above-described embodiment, the antenna elements 20 and 30 may receive an electric field generated as people walk. At this time, the outputs of the antenna elements 20 and 30 have voltage wavelengths as illustrated in FIG. 28, for example. In this manner, the receiver apparatus 100 captures, as energy, the electric field generated as people walk, so that the contact lens 1 is able to receive sufficient electric power, for example, even in a place where there is little external noise.

Modification Example H

In the above-described embodiment and the modification examples of the above-described embodiment, energy captured by the receiver apparatus 100 may be electric power or noise leaking from a notebook-size personal computer 44.

In the present disclosure, due to a structure that the human body is an antenna, and an electric field is generated with a ground of the receiver apparatus 100 or a separate conductor, receivable frequencies are not restricted by the shape of the antenna. Moreover, the structure that the ground of the receiver apparatus 100 or the separate conductor is capacitively coupled with the ground of the earth makes it possible to capture electric field energy in a quasi-electrostatic field other than radio waves. That is, it has become possible to be able to convert electric power or noise leaking from a power cord or an inverter into energy. As such, it is possible to treat the human body as a conductor and capture electric power induced in the human body itself between the receiver apparatus 100 and the ground.

For example, as illustrated in FIG. 29, the contact lens 1 with the receiver apparatus 100 is attached to the eyeball 300 of an operator. The notebook-size personal computer 44 includes a keyboard 45 made of resin, and electronic components such as a circuit board, a processor, or a switching power supply are provided directly below the keyboard 45. The electronic components generate spatial noise 46 as illustrated by arrows in FIG. 29, for example.

The operator is spatially coupled to the electronic components mounted on the notebook-size personal computer 44 via the keyboard 45 made of resin. Therefore, in a case where the operator operates the keyboard 45, the operator contacts the keyboard 45, and the receiver apparatus 100 receives the spatial noise 46 emitted from the electronic components, via the operator. In a case where the receiver apparatus 100 has a full-wave rectifier circuit and a capacitor (1.2 μF, for example) is coupled to a latter stage of the full-wave rectifier circuit, for example, a voltage of a terminal of the capacitor increases to 1.2V in 20 seconds.

Modification Example I

In Modification Example F described above, the rectifier circuit 112 may further have a voltmeter 81 of high resistance (2 MΩ or more, and desirably, 10 MΩ that measures an output voltage of the full-wave rectifier circuit, as illustrated in FIG. 30, for example. Furthermore, the rectifier circuit 112 may further have a battery 82 that charges output of the full-wave rectifier circuit outputted via the backflow prevention diode 65, as illustrated in FIG. 30, for example. At this time, the output of the battery 82 may be used as a power supply of the voltmeter 81.

Here, suppose that output of the voltmeter 81 is analyzed by a computer, or the like. At this time, it is possible to detect number of times or frequency of blinks, for example, on the basis of the output of the voltmeter 81. It is possible to determine whether or not blinking has occurred, by determining, for example, whether or not the antenna element 20 and the antenna element 30 have short-circuited.

In addition, it is possible to verify identity by checking the output of the voltmeter 81 against data of voltage fluctuations caused by walking of people. It is also possible to estimate physical conditions by checking the output of the voltmeter 81 against the data of voltage fluctuations that depend on various physical conditions of a person.

Modification Example J

In the above-described embodiment and the modification examples of the above-described embodiment, a plurality of the antenna apparatuses 110 may be coupled in series, as illustrated in FIG. 31, for example. At this time, voltage VL applied to the load 200 is a sum of the outputs of the respective antenna apparatuses 110 (V1+V2+V3). In addition, In the above-described embodiment and the modification examples of the above-described embodiment, the plurality of antenna apparatuses 110 may be coupled in parallel, as illustrated in FIG. 32, for example. At this time, current IL flowing through the load 200 is a sum of the outputs of the respective antenna apparatuses 110 (I1+I2+I3).

FIG. 33 illustrates an Example for increasing the output voltage of the antenna apparatuses 110. The antenna element 20 in contact with the human body is provided, and the two antenna elements 30 (30*a* and 30*b*) are provided for the antenna element 20. A rectifier circuit 112 (112*a*) is provided that rectifies the output of the antenna unit including the antenna elements 20 and 30*a*, and a rectifier circuit 112 (112*b*) is provided that rectifies the output of the antenna unit including the antenna elements 20 and 30*b*. The rectifier circuits 112*a* and 112*b* are coupled in series to each other, and outputs of the rectifier circuits 112*a* and 112*b* that are coupled in series to each other are inputted to the charger unit 120.

FIG. 34 illustrates a circuit configuration example of the antenna apparatus 110 of FIG. 33. A full-wave rectifier circuit is used as the rectifier circuits 112*a* and 112*b* that are coupled in series to each other. The Zener diodes 66 and 67 are made common elements to the rectifier circuits 112*a* and 112*b*. By doing so, it is possible to obtain an output voltage of 8 V in a case where, for example, the output voltage of 4 V is obtained by one antenna apparatus 110. As described above, it is possible to obtain a larger output voltage by coupling a plurality of the (two or more) rectifier circuits 112 in series. It is to be noted that in a case where frequencies such as power supply noise that induces a voltage are low, the configuration illustrated in this modification example is preferred because it is not necessary to consider a distance between the antennas.

FIG. 35 illustrates an Example for increasing the output voltage of the antenna apparatus 110. As the antenna element 20 that contacts the human body, the two mutually independent antenna elements 20*a* and 20*b* are provided. Furthermore, as the antenna element 30 that capacitively couples to the earth, the two mutually independent antenna elements 30*a* and 30*b* are provided. The rectifier circuit 112 (112*a*) is provided that rectifies the output of the antenna unit including the antenna elements 20*a* and 30*a*, and the rectifier circuit 112 (112*b*) is provided that rectifies the output of the antenna unit including the antenna elements 20*b* and 30*b*. The rectifier circuits 112*a* and 112*b* are coupled in series to each other, and the outputs of the rectifier circuits 112*a* and 112*b* that are coupled in series to each other are inputted to the charger unit 120.

FIG. 36 illustrates a configuration example of the antenna apparatus 110 having the rectifier circuits 112*a* and 112*b* that are coupled in series to each other. The Zener diodes 66 and 67 are made the common elements to the rectifier circuits 112*a* and 112*b*. By doing so, it is possible to obtain the output voltage of 8 V in a case where, for example, the output voltage of 4 V is obtained by one antenna apparatus 110. As described above, it is possible to obtain the larger output voltage by coupling the plurality of (two or more) rectifier circuits 112 in series. It is to be noted that in a case where the frequencies such as power supply noise that induces a voltage are low, the configuration illustrated in this modification example is preferred because it is not necessary to consider the distance between the antennas.

In FIG. 33 and FIG. 34, the antenna element 20 is coupled to the coupling point between a diode 61*a* and a diode 64*a* and a coupling point between a diode 61*b* and a diode 64*b*, respectively, so that the rectifier circuits 112*a* and 112*b* have a same phase. In addition, in FIG. 35 and FIG. 36, the antenna elements 20*a* and 20*b* are coupled to the diode 61*a* and the diode 64*a* and the coupling point between the diode 61*b* and the diode 64*b*, respectively, so that the rectifier circuits 112*a* and 112*b* have the same phase.

FIG. 37 illustrates an Example for increasing an output current of the antenna apparatus 110. The antenna element 20 that contacts the human body is provided, and the two antenna element 30 (30*a* and 30*b*) are provided for the antenna element 20. The rectifier circuit 112 (112*a*) is provided that rectifies the output of the antenna unit including the antenna elements 20 and 30*a*, and the rectifier circuit 112 (112*b*) is provided that rectifies the output of the antenna unit including the antenna elements 20 and 30*b*. The rectifier circuits 112*a* and 112*b* are coupled in parallel to each other, and the outputs of the rectifier circuits 112*a* and 112*b* that are coupled in parallel to each other are inputted to the charger unit 120.

FIG. 38 illustrates a circuit configuration example of the antenna apparatus 110 of FIG. 37. A full-wave rectifier circuit is used as the rectifier circuits 112*a* and 112*b* that are coupled in parallel to each other. The Zener diodes 66 and 67 are made the common elements to the rectifier circuits 112*a* and 112*b*. By doing so, it is possible to obtain an output current of 2 μA in a case where, for example, the output current of 1 μA is obtained by one antenna apparatus 110. As described above, it is possible to obtain a larger output current by coupling the plurality of (two or more) rectifier circuits 112 in parallel. It is to be noted that in a case where the frequencies such as power supply noise that induces a voltage are low, the configuration illustrated in this modification example is preferred because it is not necessary to consider the distance between the antennas.

FIG. 39 illustrates an Example for increasing the output current of the antenna apparatus 110. As the antenna element 20 that contacts the human body, the two mutually independent antenna elements 20*a* and 20*b* are provided. Furthermore, as the antenna element 30 that capacitively couples to the earth, the two mutually independent antenna elements 30*a* and 30*b* that contact different regions of the human body are provided. The rectifier circuit 112 (112*a*) is provided that rectifies the output of the antenna unit including the antenna elements 20*a* and 30*a*, and the rectifier circuit 112 (112*b*) is provided that rectifies the output of the antenna unit including the antenna elements 20*b* and 30*b*. The rectifier circuits 112*a* and 112*b* are coupled in parallel to each other, and the outputs of the rectifier circuits 112*a* and 112*b* that are coupled in parallel to each other are inputted to the charger unit 120.

FIG. 40 illustrates a configuration example of the antenna apparatus 110 having the rectifier circuits 112*a* and 112*b* coupled in parallel to each other. The Zener diodes 66 and 67 are made the common elements to the rectifier circuits 112*a* and 112*b*. By doing so, it is possible to obtain the output current of 2 μA in a case where, for example, the output current of 1 μA is obtained by one antenna apparatus 110. As described above, it is possible to obtain the larger output current by coupling the plurality of (two or more) rectifier circuits 112 in parallel. It is to be noted that in a case where the frequencies such as power supply noise that induces a voltage are low, the configuration illustrated in this modification example is preferred because it is not necessary to consider the distance between the antennas.

It is to be noted that serial coupling of the plurality of rectifier circuits 112 and parallel coupling of the plurality of rectifier circuits 112 may be combined appropriately depending on necessary voltage and current to be induced.

It is to be noted that the present disclosure may have the following configurations, for example.

(1)

A contact lens including:

a lens substrate to be worn on an eyeball;

an antenna unit that is provided on the lens substrate and receives alternating-current energy through a human body; and a load that receives electric power supplied from the antenna unit, in which the antenna unit includes:

a first antenna element including a first conductor provided at a position that is in contact with the eyeball or an eyelid when an eye is open; and a second antenna element including a second conductor provided at a position that is separated from the first conductor by a predetermined gap and not in contact with the eyeball or the eyelid when the eye is open.

(2)

The contact lens according to (1), in which the first conductor is provided on an outer edge of the lens substrate.

(3)

The contact lens according to (2), in which the second conductor is provided at a middle of the lens substrate or in a ring-shaped region centering on the middle of the lens substrate.

(4)

The contact lens according to any one of (1) to (3), in which the first conductor is provided on a surface, of the lens substrate, on side of the eyelid.

(5)

The contact lens according to (4), in which the second conductor is provided on the surface, of the lens substrate, on the side of the eyelid.

(6)

The contact lens according to (4), in which the second conductor is provided on a surface, of the lens substrate, opposite to the eyelid.

(7)

The contact lens according to any one of (4) to (6), in which the first antenna element further includes an extraction electrode in contact with the first conductor, and the extraction electrode is a wiring-like electrode configured to reach a face surface from the surface of the lens substrate.

(8)

The contact lens according to any one of (1) to (3), in which the first conductor is provided on a surface, of the lens substrate, opposite to the eyelid.

(9)

The contact lens according to (8), in which the second conductor is provided on a surface, of the lens substrate, on side of the eyelid.

(10)

The contact lens according to (8), in which the second conductor is provided on the surface, of the lens substrate, opposite to the eyelid.

(11)

The contact lens according to any one of (8) to (10), in which the first antenna element further includes an extraction electrode in contact with the first conductor, and the extraction electrode is a wiring-like electrode configured to reach a face surface from the surface of the lens substrate.

(12)

The contact lens according to any one of (8) to (10) further including:

an insulating layer that covers the second conductor.

(13)

The contact lens according to any one of (1) to (11), in which a surface of the second conductor is subjected to water repellant treatment or hydrophobic treatment.

(14)

The contact lens according to any one of (1) to (11), in which a water repellant structure or a hydrophobic structure is formed on a surface of the second conductor.

(15)

The contact lens according to any one of (1) to (5), in which the second conductor has a height from a surface of the lens substrate that is higher than a height of the first conductor from the surface of the lens substrate.

(16)

The contact lens according to any one of (1) to (15) further including a rectifier circuit that rectifies alternating-current electric field energy received by the antenna unit into direct-current.

(17)

The contact lens according to (16) further including a capacitor that stores a direct-current signal obtained by rectification in the rectifier circuit.

According to the contact lens according to one embodiment of the present disclosure, the first conductor of the first antenna element is provided on the lens substrate at the position that is in contact with the eyeball or the eyelid when the eye is open. The second conductor of the second antenna element is provided on the lens substrate at the position that is separated from the first conductor by a predetermined gap and not in contact with the eyeball or the eyelid when the eye is open. This makes it possible to receive, for example, the electric field energy of the radio waves or the quasi-electrostatic fields (near field) existing in space, through the eyeball or the eyelid. It is also possible to receive, for example, the alternating-current energy outputted from the wearable device such as the wristwatch, through the eyeball or the eyelid. As a result, the contact lens is able to receive sufficient electric power. It is to be noted that the effects described herein are not necessarily limited to the effects described here, and may be any effects described herein.

This application claims priority based on Japanese Patent Application No. 2021-111775 filed on Jul. 5, 2021 with Japan Patent Office, the entire contents of which are incorporated in this application by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A contact lens, comprising:

a lens substrate configured to be worn on an eyeball;

an antenna unit, on the lens substrate, configured to receive alternating-current electric field energy through a human body; and a load configured to receive electric power supplied from the antenna unit, wherein the antenna unit includes:

a first antenna element including a first conductor at a position that overlaps an eyelid in planar view when an eye is open; and a second antenna element including a second conductor at a position separated from the first conductor by a specific gap and positioned so as not to overlap the eyelid in the planar view when the eye is open, wherein the first conductor and the second conductor do not overlap each other in the planar view.

2. The contact lens according to claim 1, wherein the first conductor is on an outer edge of the lens substrate.

3. The contact lens according to claim 2, wherein the second conductor is at a middle of the lens substrate or in a ring-shaped region centered on the middle of the lens substrate.

4. The contact lens according to claim 1, wherein the first conductor is on a surface, of the lens substrate, on a side of the eyelid.

5. The contact lens according to claim 4, wherein the second conductor is on the surface, of the lens substrate, on the side of the eyelid.

6. The contact lens according to claim 4, wherein the second conductor is on a surface, of the lens substrate, opposite to the eyelid.

7. The contact lens according to claim 4, wherein the first antenna element further includes an extraction electrode in contact with the first conductor, and the extraction electrode is a wiring-like electrode configured to reach a face surface from the surface of the lens substrate.

8. The contact lens according to claim 1, wherein the first conductor is on a surface, of the lens substrate, opposite to the eyelid.

9. The contact lens according to claim 8, wherein the second conductor is on a surface, of the lens substrate, on a side of the eyelid.

10. The contact lens according to claim 8, wherein the second conductor is on the surface, of the lens substrate, opposite to the eyelid.

11. The contact lens according to claim 8, wherein the first antenna element further includes an extraction electrode in contact with the first conductor, and the extraction electrode is a wiring-like electrode configured to reach a face surface from the surface of the lens substrate.

12. The contact lens according to claim 1 further comprising an insulating layer that covers the second conductor.

13. The contact lens according to claim 1, wherein a surface of the second conductor is subjected to water repellant treatment or hydrophobic treatment.

14. The contact lens according to claim 1, wherein a water repellant structure or a hydrophobic structure is on a surface of the second conductor.

15. The contact lens according to claim 1, wherein the second conductor has a height from a surface of the lens substrate that is higher than a height of the first conductor from the surface of the lens substrate.

16. The contact lens according to claim 1, further comprising a rectifier circuit configured to convert the alternating-current electric field energy received by the antenna unit into direct-current.

17. The contact lens according to claim 16, further comprising a capacitor configured to store the direct-current obtained from the rectifier circuit.

* * * * *